(12) United States Patent
Jawalkar Nagaraj et al.

(10) Patent No.: US 8,939,859 B2
(45) Date of Patent: Jan. 27, 2015

(54) TORQUE CONVERTER WITH STATOR CLUTCH

(71) Applicant: Caterpillar Inc., Peoria, IL (US)

(72) Inventors: Amarnath Rao Jawalkar Nagaraj, Peoria, IL (US); Timothy J. May, Princeton, IL (US)

(73) Assignee: Caterpillar Inc., Peoria, IL (US)

( * ) Notice: Subject to any disclaimer, the term of this patent is extended or adjusted under 35 U.S.C. 154(b) by 56 days.

(21) Appl. No.: 13/656,162

(22) Filed: Oct. 19, 2012

(65) Prior Publication Data

US 2014/0113767 A1 Apr. 24, 2014

(51) Int. Cl.
  *F16D 47/06* (2006.01)
  *F16H 47/08* (2006.01)

(52) U.S. Cl.
  USPC .......... 475/35; 475/44; 475/47; 475/48; 192/3.29; 192/3.3

(58) Field of Classification Search
  USPC .................. 475/44, 43, 35, 47, 48
  See application file for complete search history.

(56) References Cited

U.S. PATENT DOCUMENTS

| | | | |
|---|---|---|---|
| 4,704,922 A | 11/1987 | Suketomo et al. | |
| 5,667,451 A * | 9/1997 | Park | 475/44 |
| 5,857,934 A * | 1/1999 | Ohkubo | 475/44 |
| 6,293,379 B1 * | 9/2001 | Gradu et al. | 192/3.22 |
| 2004/0134735 A1 * | 7/2004 | Klement et al. | 192/3.32 |

FOREIGN PATENT DOCUMENTS

| | | |
|---|---|---|
| JP | 62165064 | 7/1987 |
| JP | 05001058 | 1/1993 |
| JP | 05126252 | 5/1993 |
| JP | 2009257372 | 11/2009 |
| JP | 2010169151 A | 8/2010 |

* cited by examiner

*Primary Examiner* — Troy Chambers
*Assistant Examiner* — Lillian Nguyen
(74) *Attorney, Agent, or Firm* — Baker Hostetler

(57) ABSTRACT

A torque converter includes a prime mover input and an impeller configured to rotate in response to the prime mover input. The torque converter further includes a turbine arranged with the impeller and configured to rotate in response to rotation of the impeller, a stator arranged with the impeller and the turbine, and a stator clutch configured to allow rotation of the stator in a first mode and configured to limit rotation of the stator in a second mode. The torque converter further including a stator clutch actuator configured to activate and deactivate the stator clutch to place the stator clutch in the second mode during particular operations and to place the stator clutch in the first mode. A vehicle and a process of converting torque for operation of a vehicle are also disclosed.

20 Claims, 9 Drawing Sheets

TORQUE CONVERTER WITH STATOR CLUTCH

TECHNICAL FIELD

The disclosure relates to a torque converter having a stator clutch and a process of operating the torque converter having the stator clutch. More particularly, the disclosure relates a torque converter having a stator clutch and the process of operating the torque converter having the stator clutch to improve performance.

BACKGROUND

Many vehicles generally have a prime mover or internal combustion engine, a transmission to transmit drive power to move the vehicle, and a mechanism to selectively transfer rotational torque from the prime mover to the transmission. In some approaches, the mechanism to selectively transfer rotation from the prime mover to the transmission includes a manual clutch. A manual clutch is efficient. However, operation of the manual clutch requires extra effort and added operational oversight by the vehicle operator. Such extra effort and added operational oversight can be less desirable, for example it can reduce the operator's efficiency. An alternative mechanism to transfer rotational torque from the prime mover to the transmission is a torque converter.

A torque converter is generally a hydrodynamic fluid coupling that typically transfers the rotational torque from a prime mover to a driven load such as a transmission. The torque converter typically includes an impeller, a turbine, and a stator. The torque converter multiplies the torque from the prime mover and transfers the torque to the transmission. Japanese patent publication JP 2010/169151 to Nissan dated Aug. 5, 2010 discloses a torque converter for an automatic transmission capable of achieving fuel economy and power performance in a vehicle by using a desirable engine rotation profile. The torque converter for the automatic transmission determines a target value expressed by a ratio Ns/Ne. The ratio is based on a rotation speed Ns of a stator and a rotation speed Ne of an engine output shaft based on an operational state of the vehicle, and controls a braking torque with respect to the stator based on the target value. However, the operation of such torque converters can result in lower performance. For example, the operation of such torque converters can result in decreased efficiency and increased operating temperatures.

Accordingly, a torque converter having improved performance is needed.

SUMMARY

The foregoing needs are met, to a great extent, by the disclosure, wherein in one aspect a process and device are provided to improve performance, increase efficiency, and lower operating temperature of a torque converter having stator clutch.

In accordance with one embodiment, a torque converter includes a prime mover input configured to receive a prime mover input torque from a prime mover, an impeller configured to rotate in response to the prime mover input, a turbine arranged with the impeller and configured to rotate in response to rotation of the impeller, a stator arranged with the impeller and the turbine, a stator clutch configured to allow rotation of the stator in a first mode and configured to limit rotation of the stator in a second mode, a stator clutch actuator configured to activate and deactivate the stator clutch to place the stator clutch in the first mode during particular operations and to otherwise place the stator clutch in the second mode, and a torque converter output.

In accordance with another embodiment, a process of converting torque for operation of a vehicle includes receiving a prime mover input torque from a prime mover, operating an impeller in response to the prime mover input torque, generating a torque output with a turbine arranged with the impeller in response to operation of the impeller, and limiting rotation of a stator in a first mode during particular operations and allowing rotation of the stator in a second mode.

In accordance with yet another embodiment, a torque converter includes means for receiving a prime mover input torque from a prime mover means, means for operating an impeller means in response to the means for receiving the prime mover input torque, means for generating a torque output with a turbine means arranged with the means for operating the impeller means, and means for limiting rotation of a stator means in a first mode during particular operations and means for allowing rotation of the stator means in a second mode.

DETAILED DESCRIPTION

Figure 1:
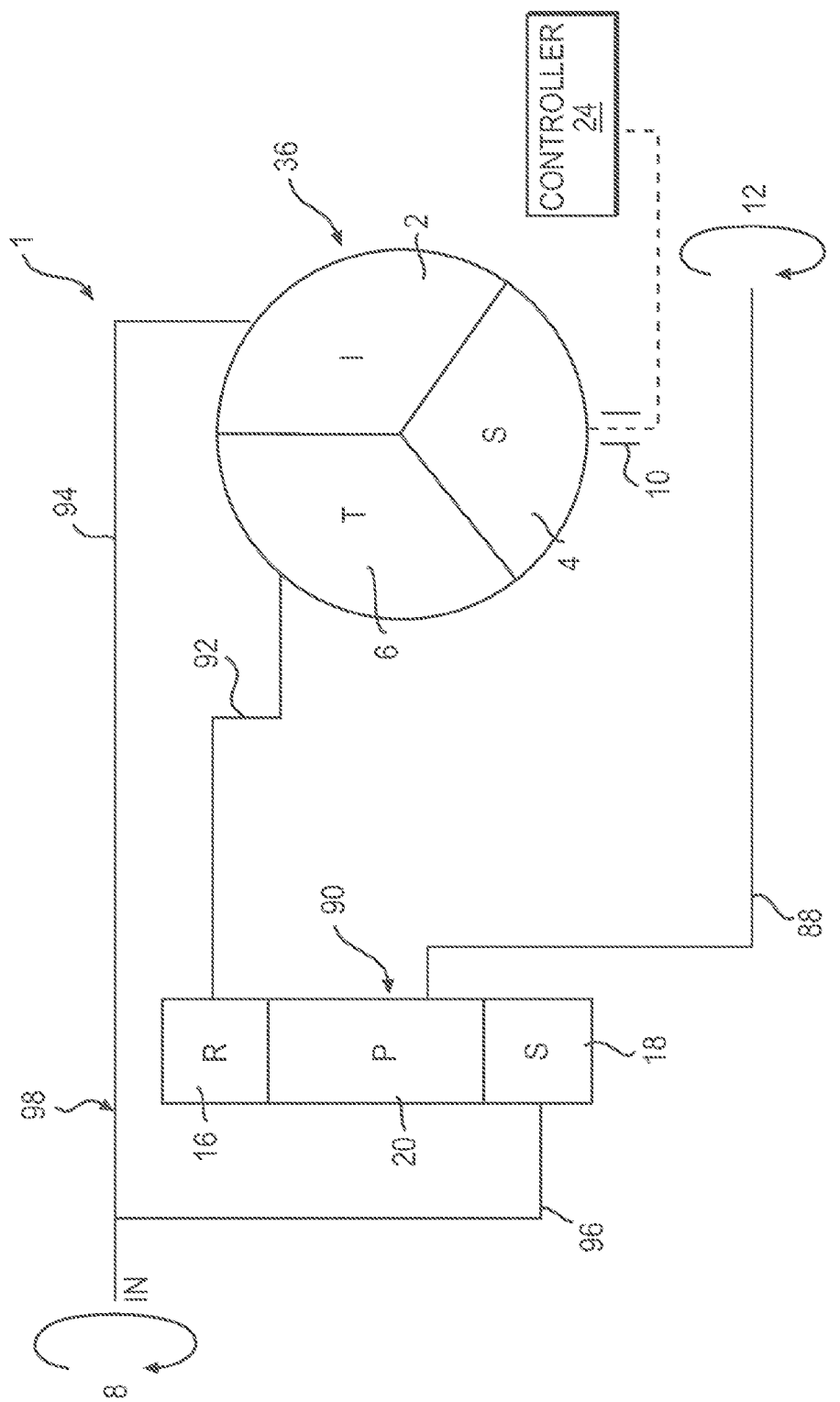
FIG. 1 shows a schematic of a torque converter with a stator clutch in accordance with aspects of the disclosure.

The disclosure will now be described with reference to the drawing figures, in which like reference numerals refer to like parts throughout. Embodiments of the disclosure advantageously provide a torque converter having a stator clutch that improves performance, increases efficiency, and reduces operating temperature. Finally, the torque converter and stator clutch of the disclosure is applicable for use with vehicles.

FIG. 1 shows a schematic of a torque converter with a stator clutch in accordance with aspects of the disclosure. In particular, FIG. 1 shows a torque converter 1 that includes a prime mover input 8 and a torque converter output 12.

The torque converter 1 includes an impeller 2, a stator 4, and a turbine 6. The impeller 2 may rotate in response to the prime mover input 8. The rotation of the impeller 2 may generate a hydrodynamic fluid coupling within the torque converter 1 and accordingly rotate turbine 6. The stator 4 may be interposed between the impeller 2 and the turbine 6. The stator 4 may positively and efficiently alter the fluid flow between the turbine 6 and the impeller 2.

Additionally, FIG. 1 shows a stator clutch 10 that limits movement of the stator 4 in the torque converter 1. More specifically, the stator clutch 10, when activated, may limit movement of the stator 4. The stator clutch 10 may be activated during predetermined vehicle operations. The predetermined vehicle operations may include operation of the vehicle utilizing a retarding function such as downhill driving and directional shifts. Other vehicle operations are contemplated as well. Activation of the stator clutch 10 during these predetermined vehicle operations improves performance of the torque converter 1. In particular, the operating temperature of the torque converter 1 is reduced while maintaining higher efficiency of the torque converter The stator 4 may freely rotate within the torque converter 1 when the stator clutch 10 is not activated. However, the stator 4 may also include in an alternative aspect a mechanism to limit the rotational movement within the torque converter 1. In the alternative aspect, the stator 4 may include a freewheel clutch (not shown). The freewheel clutch may allow for rotation of the stator 4 in a desired direction and prevent rotation of the stator 4 in the opposite direction.

In some aspects, the torque converter 1 may include a torque divider 98 that splits the torque from the prime mover input 8. However, it should be noted that a torque divider is not necessary for the practice of the torque converter disclosed herein. In the aspect shown in FIG. 1, the torque divider 98 splits the torque between the impeller 2 and a planetary system 90. More specifically, prime mover input 8 may be split to generate an impeller input torque 94 and a planetary system input torque 96.

The impeller input torque 94 may be transferred to the impeller 2. The impeller 2 rotates within the torque converter 1 in response to the impeller input torque 94 and hydrodynamically couples with the turbine 6 to rotate the turbine 6. Rotation of the turbine 6 generates a turbine output torque 92. The turbine output torque 92 may then be input to the planetary system 90.

The planetary system input torque 96 may be input to the planetary system 90. Within the planetary system 90, the turbine output torque 92 and the planetary system input torque 96 are combined and result in a planetary output torque 88. The planetary output torque 88 results in the torque converter output 12. This resulting torque converter output 12 may be generated prior to being input to a transmission. The torque converter output 12 may then be used to drive a load of the vehicle, is input to a vehicle transmission, operates a power takeoff and/or the like.

In a particular aspect, the planetary system input torque 96 may be used to drive a sun gear 18 of the planetary system 90. The turbine output torque 92 may be used to drive a ring gear 16 of the planetary system 90. Within the planetary system 90, the planetary system input torque 96 and the turbine output torque 92 may be combined and output from a planet gear 20 as the aforementioned planetary output torque 88.

Operation of the torque converter 1 may include two operational modes: a starting or normal operation wherein the stator clutch 10 is not activated; and a locked stator mode when the stator clutch 10 is activated. More specifically, during the starting or normal operation, power or torque from the prime mover input 8 utilizes the torque converter 1 and associated torque multiplication where the impeller 2 rotates, the stator 4 rotates, and multiplies the torque to rotate the turbine 6. In the locked stator mode, the stator clutch 10 is activated to mechanically limit rotation of the stator 4 and performance of the torque converter 1 is improved during certain operations including a reduction in the operating temperature and an increase in efficiency. The stator clutch 10 being activated, for example, during vehicle operations including utilizing a retarding function such as downhill driving and directional shifts. Other vehicle operations utilizing the lock stator mode are contemplated as well.

Additionally, operation and activation of the stator clutch 10 may be controlled by dedicated hardware. The dedicated hardware may activate and may deactivate the stator clutch 10 in response to a number of factors. In particular, the dedicated hardware may take the form of a controller 24 as shown in FIG. 1. The factors can include one or more of prime mover RPM, power, torque, vehicle speed, vehicle acceleration, transmission operation, vehicle inclination, current power needs, and the like. In particular, the stator clutch 10 may be activated by the dedicated hardware, for example, during vehicle operations including utilizing a retarding function such as downhill driving and directional shifts. Other vehicle operations utilizing the lock stator mode are contemplated as well.

Figure 2:
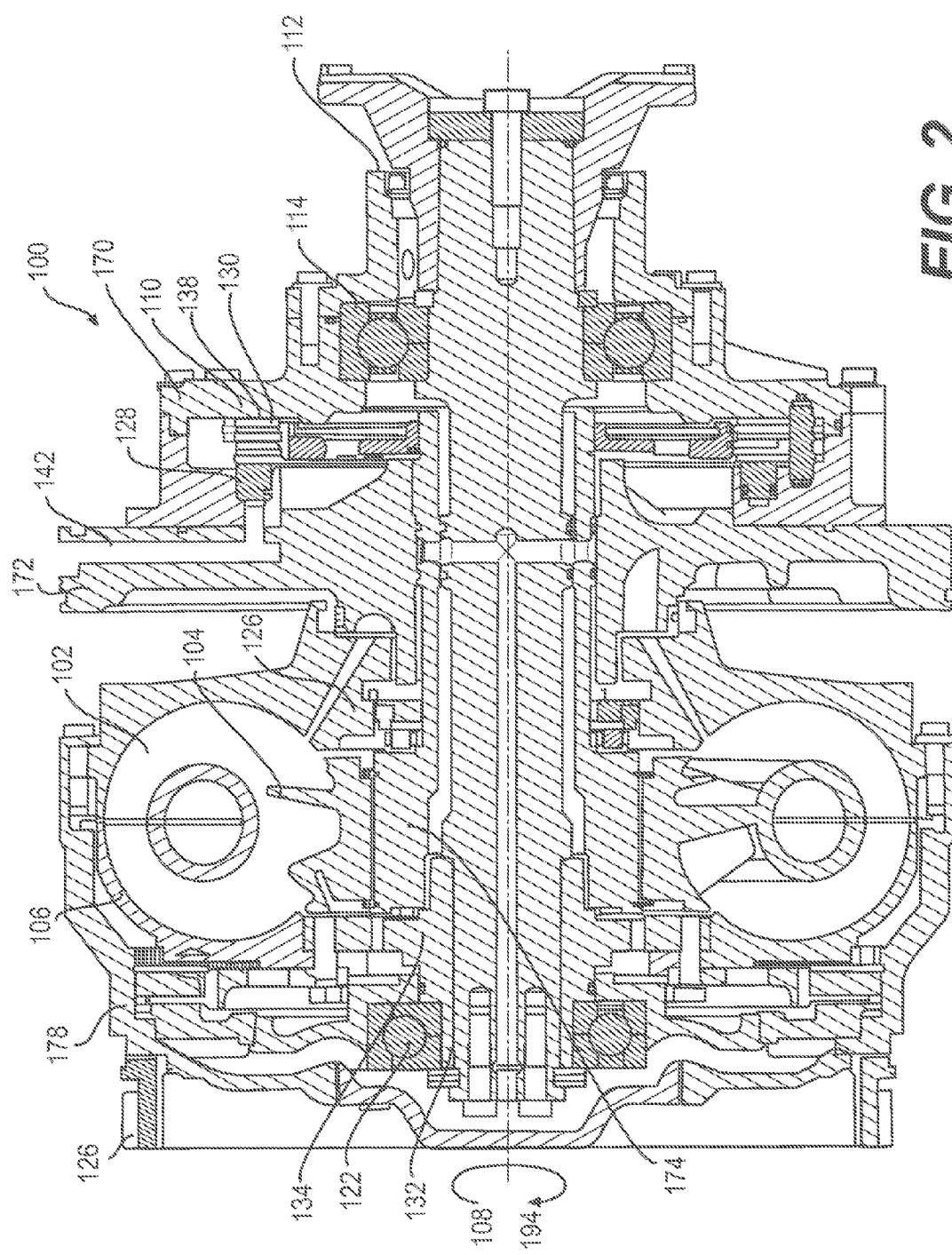
FIG. 2 is a cross-sectional view of an implementation of the torque converter with the stator clutch of FIG. 1.
Figure 3:
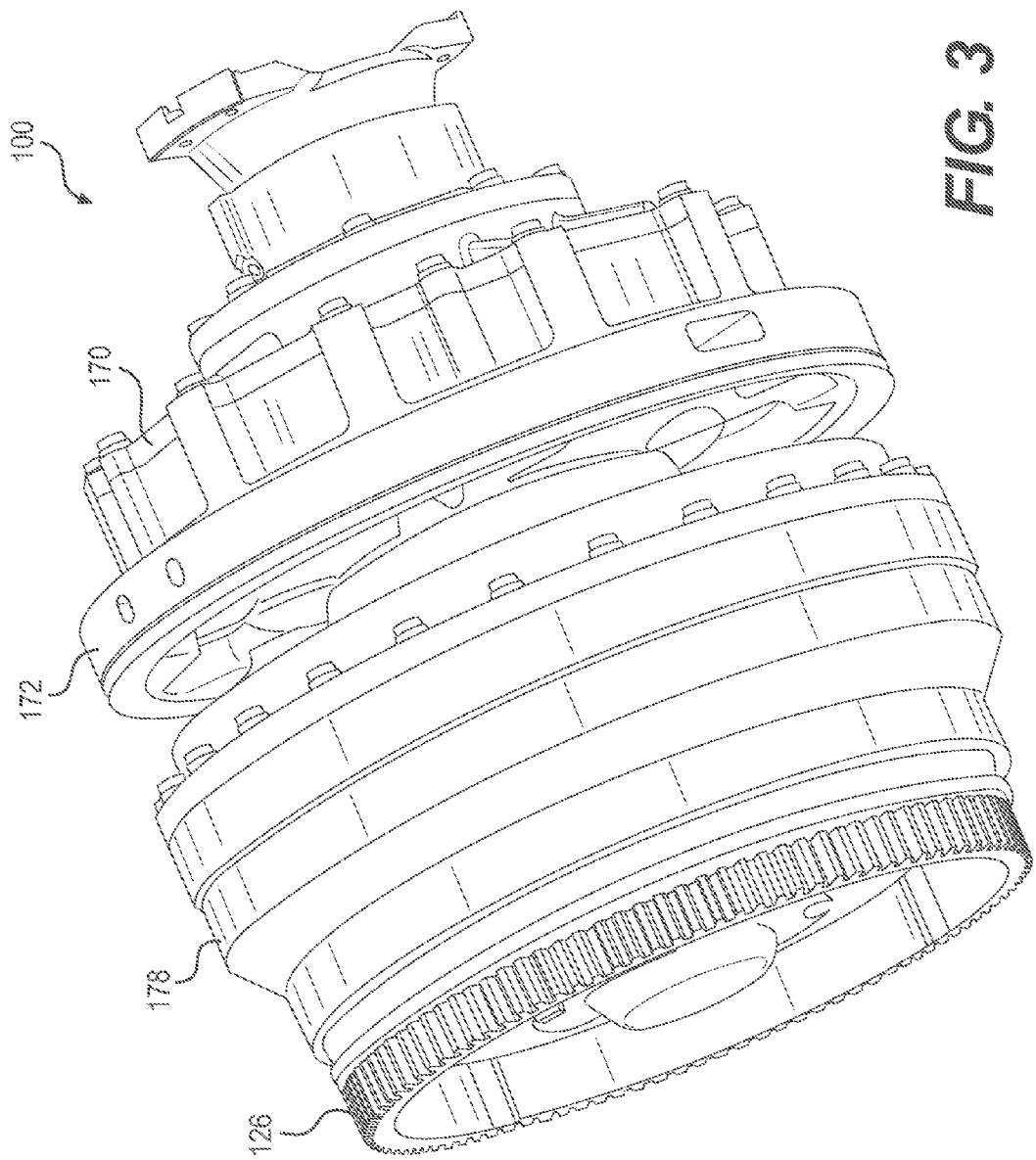
FIG. 3 is a perspective view of the implementation of the torque converter with the stator clutch of FIG. 2.
Figure 4:
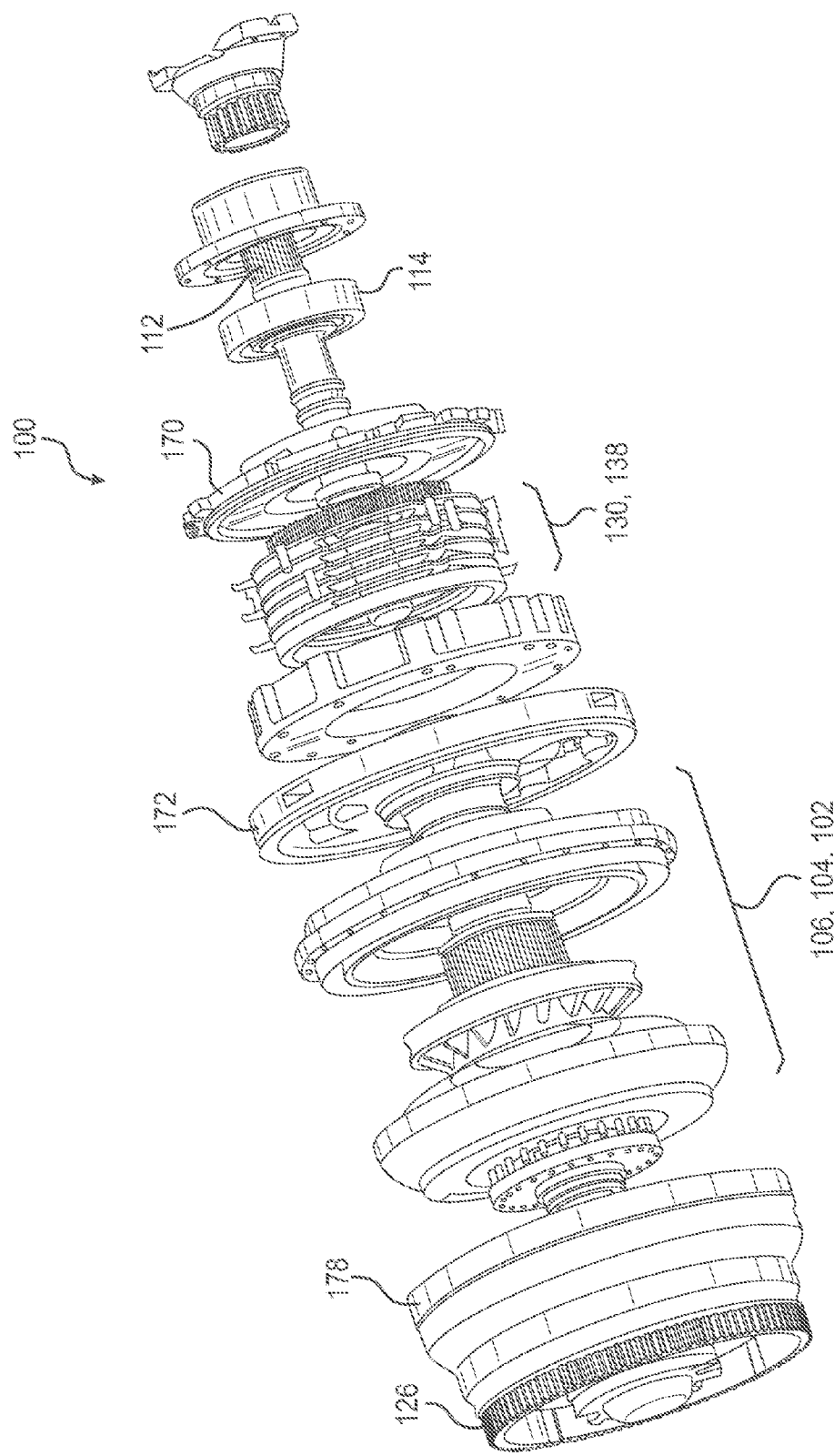
FIG. 4 is an exploded view of the implementation of the torque converter with the stator clutch of FIG. 2.

FIG. 2 is a cross-sectional view of an implementation of the torque converter with the stator clutch of FIG. 1; FIG. 3 is a perspective view of the implementation of the torque converter with the stator clutch of FIG. 2; and FIG. 4 is an exploded view of the implementation of the torque converter with the stator clutch of FIG. 2.

As shown in FIG. 2, a prime mover input 108 may be received by a torque converter 100. In particular, the prime mover input 108 may connect to the torque converter 1 through drive splines 126 that may be arranged on a rotating housing 178. Alternatively, a torque divider may be utilized with the torque converter 100 similar to an aspect of FIG. 1 that includes the torque converter 1 and the torque divider 98. If a torque converter is utilized, then an impeller input torque 194 may connect to the torque converter 100 through drive splines 126 or the like that may be arranged on the rotating housing 178.

The rotating housing 178 transfers the rotational torque to an impeller 102. The impeller 102 is located within the torque converter 100. The impeller 102 may be arranged on an impeller hub 176. Also arranged within the torque converter 100 is a turbine 106. Rotational torque may be hydrodynamically transferred from the impeller 102 to the turbine 106 and consequently may be transferred to a turbine hub 134. The turbine hub 134 may include a mechanical connection to an output shaft 112. The mechanical connection of the turbine hub 134 to the output shaft 112 may be any type of mechanical connection. As shown in FIG. 2, the mechanical connection may be in the form of a splined connection 132. Thus, the prime mover input 108 and/or the impeller input torque 194 rotates the rotating housing 178, rotates the impeller 102 of the torque converter 100, rotates the turbine 106 and may rotate the turbine hub 134, and results in transfer of torque to the output shaft 112.

The torque converter 100 includes a stator 104. The stator 104 may be interposed between the impeller 102 and the turbine 106. The stator 104 may positively and efficiently alter the fluid flow between the turbine 106 and the impeller 102. The stator 104 may be mounted on a stator hub 174. The stator hub 174 may allow rotation of the stator 104 with respect to the turbine 106 and the impeller 102. The stator hub 174 may extend along the output shaft 112 under a wall structure 172. Rotation of the stator 104 results in rotation of the stator hub 174. Similarly, limiting rotation of the stator hub 174 will limit rotation of the stator 104.

Additionally, FIG. 2 shows a stator clutch 110 that limits movement of the stator 104 in the torque converter 100. The stator clutch 110 may be operatively connected in part with the stator hub 174. Additionally, the stator clutch 110 may be operatively connected in part with the wall structure 172 through a clutch housing 170. Accordingly, the stator clutch 110 links the wall structure 172 with the stator hub 174 to limit movement therebetween. More specifically, the stator clutch 110, when activated, limits movement of the stator hub 174 and accordingly limits movement of the stator 104. The stator clutch 110 may be activated during predetermined vehicle operations. The predetermined vehicle operations may include operation of the vehicle utilizing a retarding function such as downhill driving and directional shifts. Activation of the stator clutch 110 during these predetermined vehicle operations improves performance of the torque converter 100. In particular the operating temperature of the torque converter 1 is reduced.

In one particular aspect, the stator clutch 110 may include one or more friction discs 130 and one or more separation plates 138 arranged therein. The one or more friction discs 130 may rotate with either the stator 104 or the clutch housing 170. The one or more separation plates 138 may rotate with the other one of the stator 104 or the clutch housing 170. When the stator clutch 110 is not activated the one or more friction discs 130 and the one or more separation plates 138 may freely move with respect to one another. When the stator clutch 110 is activated, the one or more separation plates 138 and the one or more friction discs 130 are pressed against one another such that they no longer freely rotate with respect to one another.

The stator clutch 110 may be activated by operation of a clutch piston 128. The clutch piston 128 may be hydraulically activated or deactivated in response to an application of pressurized hydraulic fluid from a pressurized source of hydraulic fluid applied along hydraulic line 142. More specifically the clutch piston 128 may extend or retract in response to the hydraulic fluid in the hydraulic line 142. Additionally, the clutch piston 128 may include a spring that provides an additional force either extending or retracting the clutch piston 128. In a particular aspect, the spring may be loaded so as to engage the clutch. In this regard should the clutch fail, the stator 104 will fail in the locked configuration. In alternative embodiments, a spring or like structure can be configured such that the clutch and spring configuration are disengaged. In this regard, failed clutch components will cause the stator to freewheel.

The stator 104 may freely rotate within the torque converter 100 when the stator clutch 110 is not activated. However, the stator 104 may also include a mechanism to limit the rotational movement within the torque converter 100. In this regard, the stator 104 may in an alternative aspect include a freewheel clutch. The freewheel clutch may allow for rotation of the stator 104 in a desired direction and prevent rotation of the stator 104 in the opposite direction.

Similar to the operation of the disclosure with respect to FIG. 1, operation of the torque converter 100 may include two operational modes: a starting or normal operation wherein the stator clutch 110 is not activated; and a locked stator mode when the stator clutch 110 is activated. More specifically, during the starting or normal operation, power or torque from the prime mover input 108 utilizes the torque converter 1 and associated torque multiplication where the impeller 102 rotates, the stator 104 rotates, and multiplies the torque to rotate the turbine 106. In the locked stator mode, the stator clutch 110 is activated to mechanically limit rotation of the stator 104 and performance of the torque converter 100 is improved during certain operations including a reduction in the operating temperature and an increase in efficiency. The stator clutch 110 being activated, for example, during operation of the vehicle utilizing a retarding function such as downhill driving and directional shifts. Other vehicle operations utilizing the lock stator mode are contemplated as well.

Similar to the operation of the disclosure with respect to FIG. 1, operation and activation of the stator clutch 110 may be controlled by dedicated hardware. The dedicated hardware may activate and may deactivate the stator clutch 110 in response to a number of factors. In particular, the dedicated hardware may take the form of a controller similar to the controller 24 shown in FIG. 1. The factors can include one or more of prime mover RPM, power, torque, vehicle speed, vehicle acceleration, transmission operation, vehicle inclination, current power needs, and the like. In particular, the stator clutch 110 being activated by the dedicated hardware, for example, during operation of the vehicle utilizing a retarding function such as downhill driving and directional shifts.

Based on a torque converter with a stator clutch constructed in accordance with the disclosure, PUGH analysis was conducted with at least six different arrangements. The torque converter with stator clutch resulted in lowering the power takeoff temperature by 2.2° C. Additionally, the torque converter and stator clutch of the disclosure provided the same or similar retarding capabilities as a torque converter having a non-freewheel stator.

The torque converter 100 may further include various structural configurations to arrange the structure about the output shaft 112. In particular, bearings 114, 122 may be arranged adjacent the output shaft 112 and other portions of the torque converter 100. More specifically, the bearings 122 may be arranged between the rotating housing 178 and the turbine hub 134 and splined connection 132 and/or outside the output shaft 112. The bearings 114 may be arranged between output shaft 112 and clutch housing 170.

Figure 5:
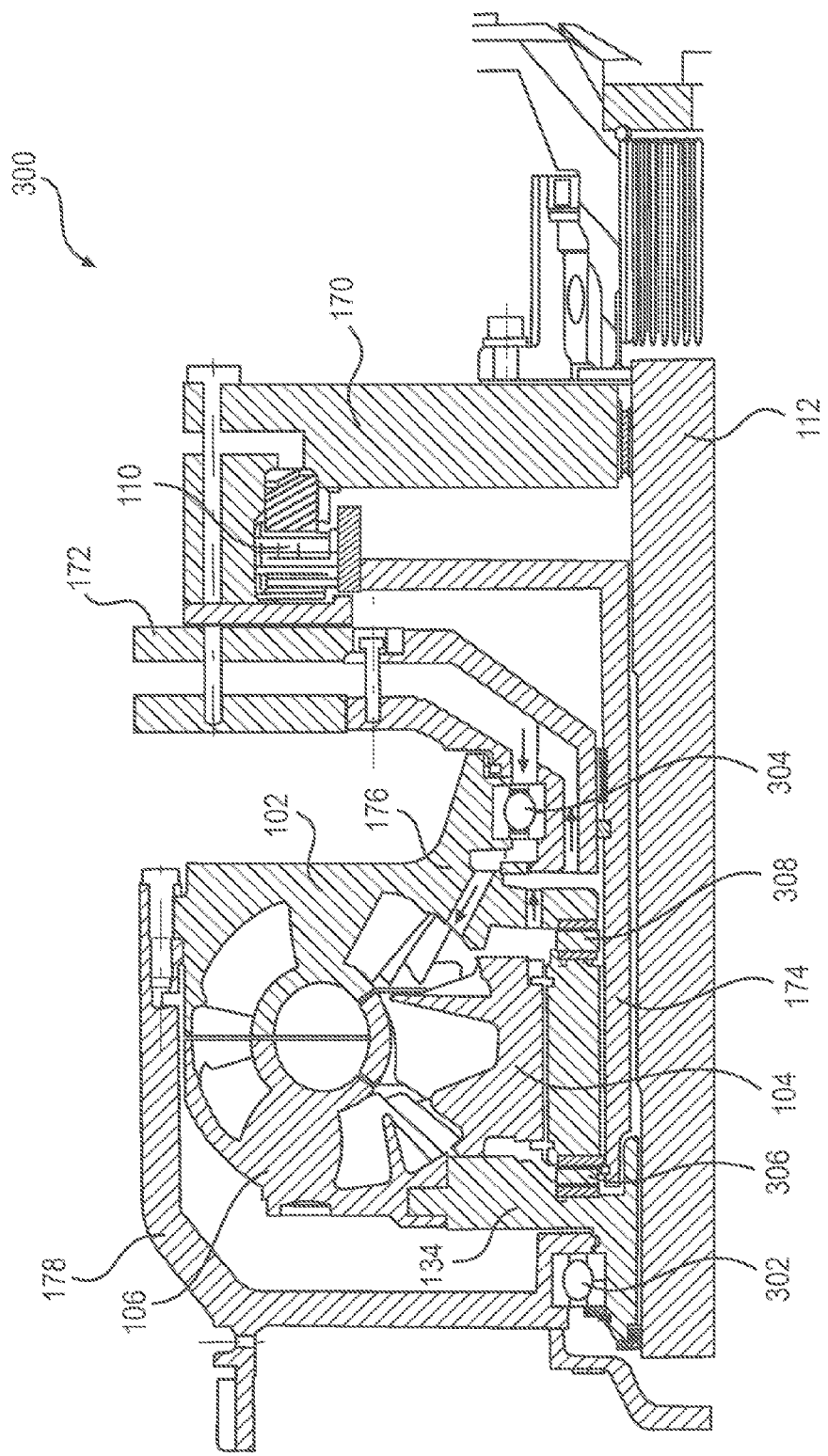
FIG. 5 is a cross-sectional view of an implementation of the torque converter with the stator clutch of FIG. 1.

FIG. 5 is a cross-sectional view of an implementation of the torque converter with the stator clutch of FIG. 1. In particular, FIG. 5 shows a torque converter 300 having a rotating housing 178, an impeller 102, an impeller hub 176, a turbine 106, a turbine hub 134, a stator 104, a stator hub 174, a clutch housing 170, a stator clutch 110, and a wall structure 172. Each of these components operating and arranged in a substantially similar manner to that as described above with respect to the description of FIG. 2.

Additionally, FIG. 5 shows that the rotating housing 178 may be supported by bearings 302 on the turbine hub 134. In a particular aspect, the bearings 302 may be ball bearings. FIG. 5 further shows bearings 304 arranged between the impeller hub 176 and an extension of the wall structure 172. In a particular aspect, the bearings 304 may be ball bearings. Finally the stator hub 174 may include bearings 306, 308 arranged on either side thereof. This arrangement of the torque converter 300 and bearings allows the stator clutch 110 to be externally serviceable and provides good radial support.

Figure 6:
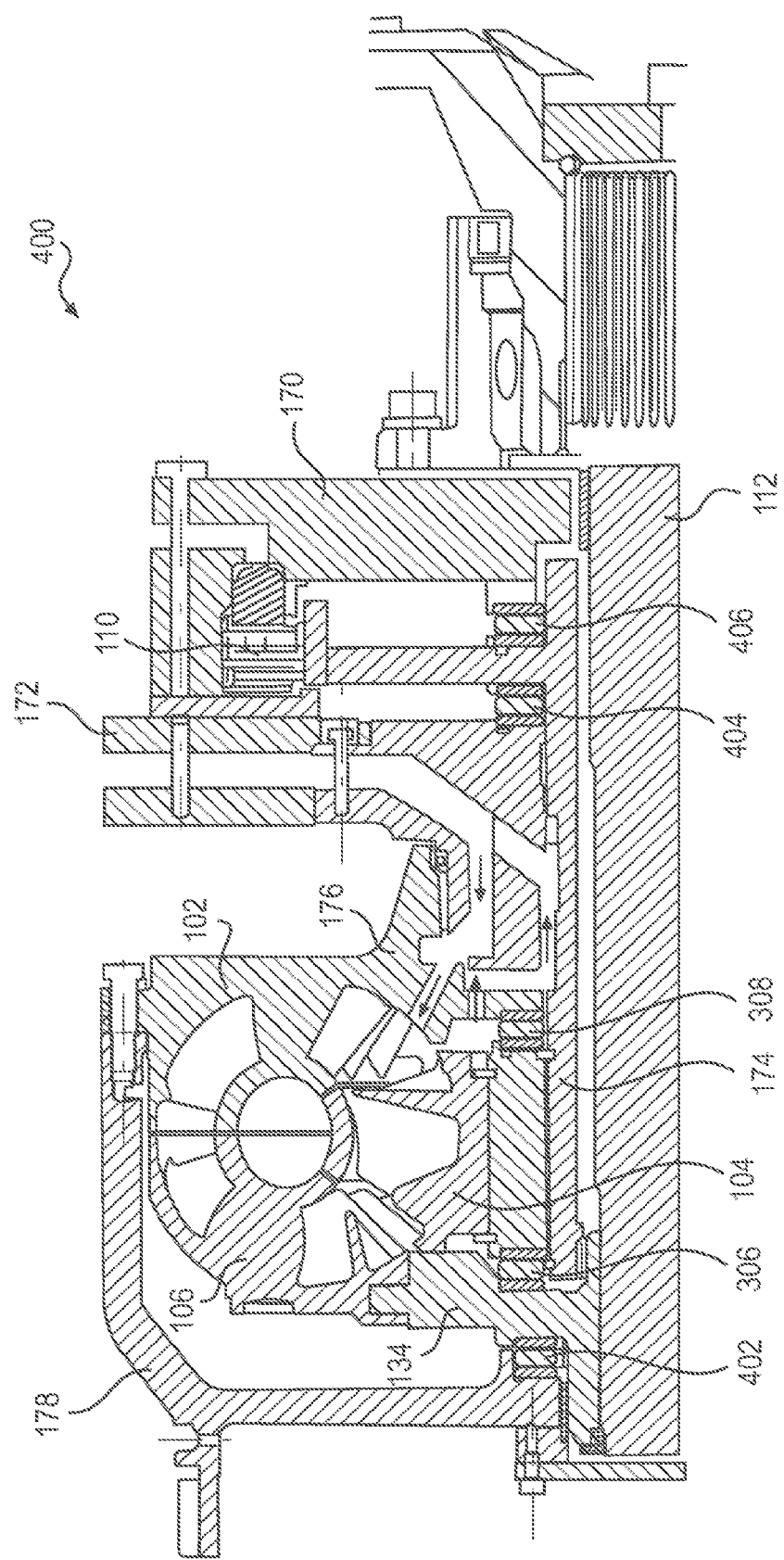
FIG. 6 is a cross-sectional view of an implementation of the torque converter with the stator clutch of FIG. 1.

FIG. 6 is a cross-sectional view of an implementation of the torque converter with the stator clutch of FIG. 1. In particular, FIG. 6 shows a torque converter 400 having a rotating housing 178, an impeller 102, an impeller hub 176, a turbine 106, a turbine hub 134, a stator 104, a stator hub 174, a clutch housing 170, a stator clutch 110, and a wall structure 172. Each of these components operating and arranged in a substantially similar manner to that as described above with respect to the description of FIG. 2.

Additionally, FIG. 6 shows bearings 402 arranged between the rotating housing 178 and the turbine hub 134. In a particular aspect, the bearings 402 may be thrust bearings. FIG. 6 further shows bearings 404, 406 arranged on either side of a portion of the stator hub 174. In a particular aspect, the bearings 404, 406 may be thrust bearings. Finally the stator hub 174 may include bearings 306, 308 arranged on either side thereof. This arrangement of the torque converter 400 and bearings allows the stator clutch 110 to be easily externally serviceable. Furthermore, the thrust bearing configuration positively engages the thrust loads.

Figure 7:
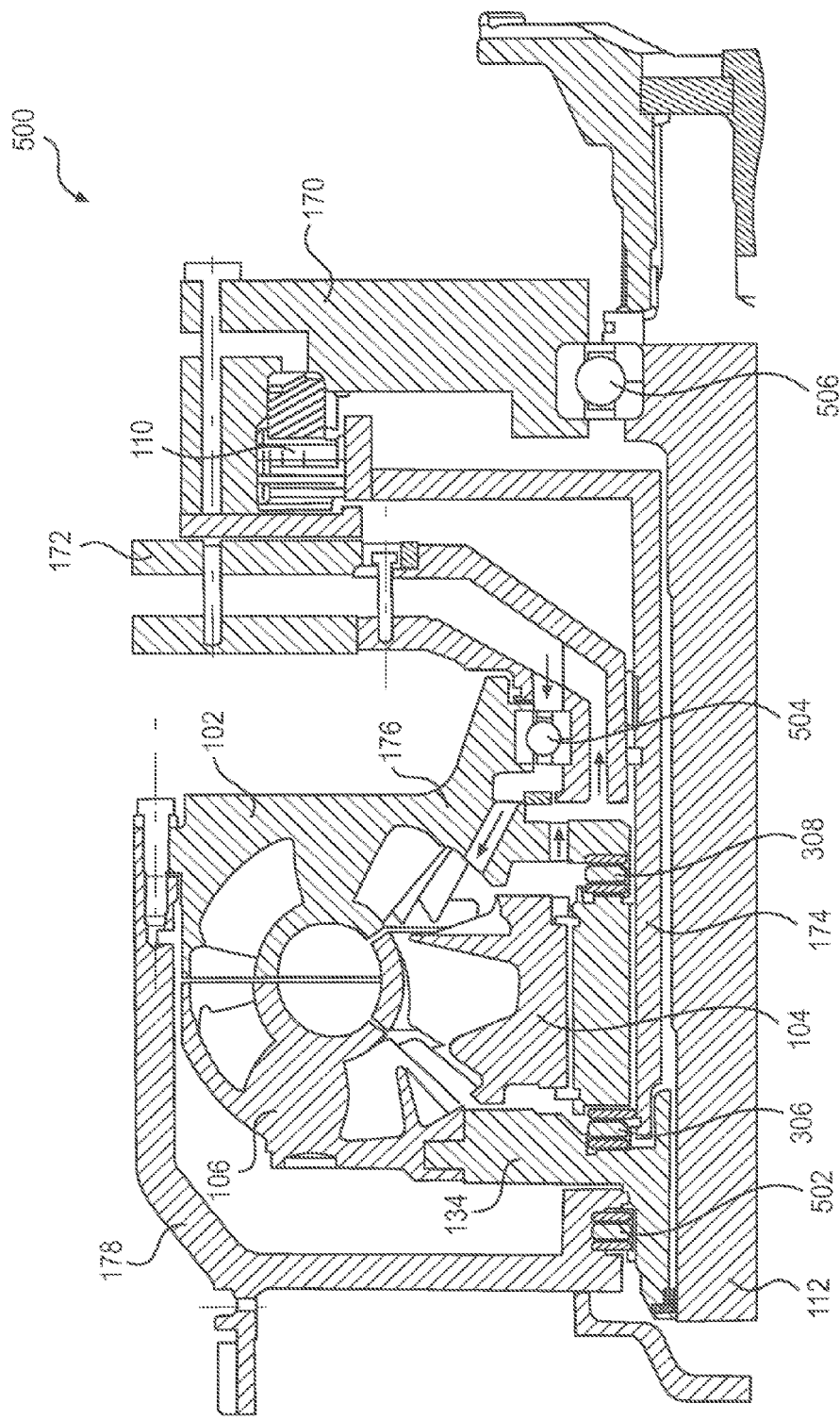
FIG. 7 is a cross-sectional view of an implementation of the torque converter with the stator clutch of FIG. 1.

FIG. 7 is a cross-sectional view of an implementation of the torque converter with the stator clutch of FIG. 1. In particular, FIG. 7 shows a torque converter 500 having a rotating housing 178, an impeller 102, an impeller hub 176, a turbine 106, a turbine hub 134, a stator 104, a stator hub 174, a clutch housing 170, a stator clutch 110, and a wall structure 172. Each of these components operating and arranged in a substantially similar manner to that as described above with respect to the description of FIG. 2.

Additionally, FIG. 7 shows bearings 502 arranged between the rotating housing 178 and the turbine hub 134. In a particular aspect, the bearings 402 may be thrust bearings. FIG. 7 further shows bearings 504 arranged between the impeller hub 176 and an extension of the wall structure 172. Additionally, the torque converter 500 may include bearings 506 arranged between the clutch housing 170 and the output shaft 112. This arrangement provides radial support for the components therein.

Figure 8:
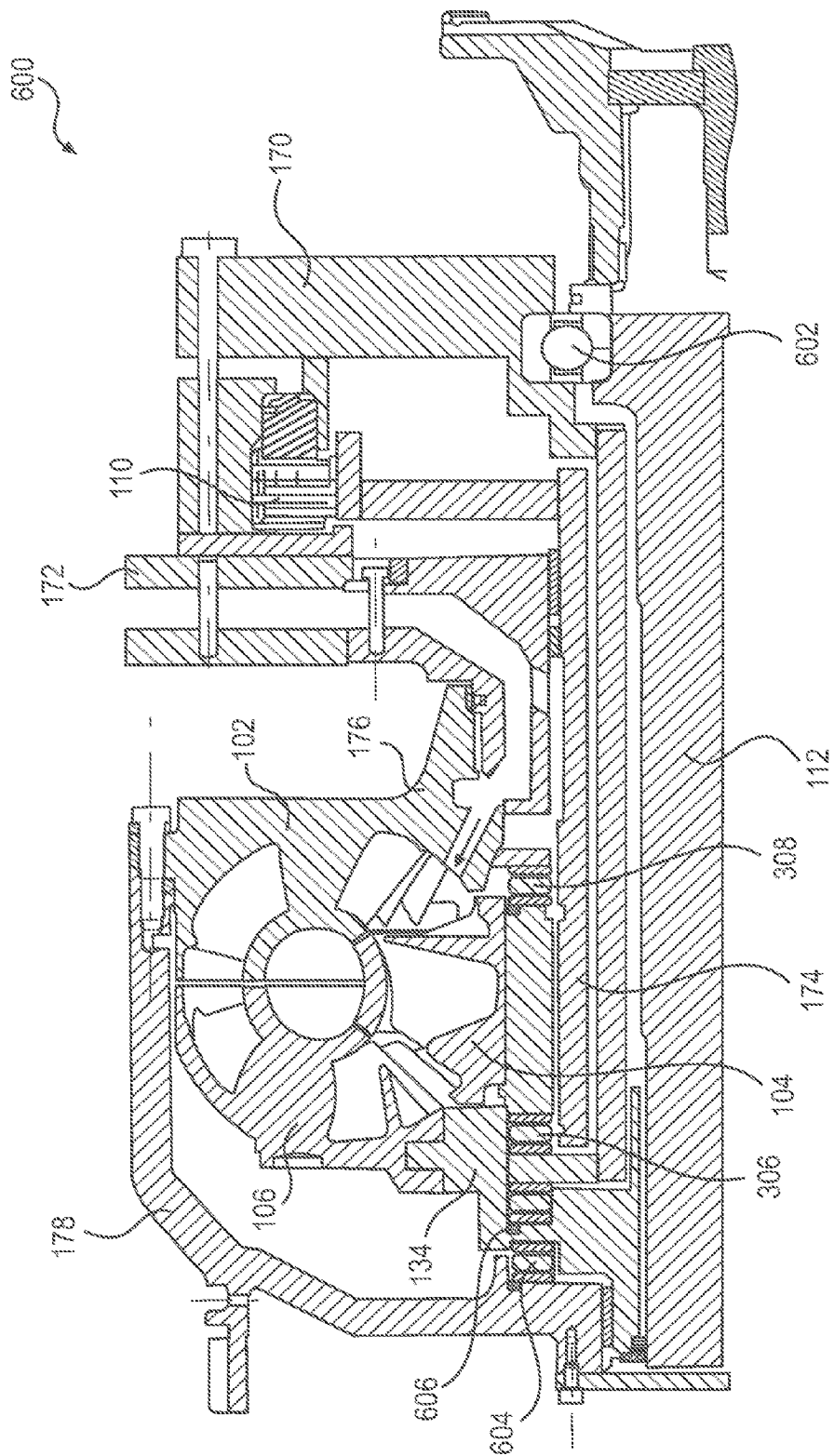
FIG. 8 is a cross-sectional view of an implementation of the torque converter with the stator clutch of FIG. 1.

FIG. 8 is a cross-sectional view of an implementation of the torque converter with the stator clutch of FIG. 1. In particular, FIG. 8 shows a torque converter 600 having a rotating housing 178, an impeller 102, an impeller hub 176, a turbine 106, a turbine hub 134, a stator 104, a stator hub 174, a clutch housing 170, a stator clutch 110, and a wall structure 172. Finally the stator hub 174 may include bearings 306, 308 arranged on either side thereof. Each of these components operating and arranged in a substantially similar manner to that as described above with respect to the description of FIG. 2.

Additionally, FIG. 8 shows bearings 602 arranged between the output shaft 112 and the clutch housing 170. In a particular aspect, the bearings 602 may be ball bearings. The torque converter 600 may further include bearings 604, 606 arranged on either side of the turbine hub 134. Additionally, the bearings 604 may contact the rotating housing 178. In a particular aspect, bearings 604, 606 may be thrust bearings. Finally, the stator hub 174 may include bearings 306, 308 arranged on either side thereof. This arrangement of the torque converter 600 results in a shorter axial length as compared to other configurations.

Figure 9:
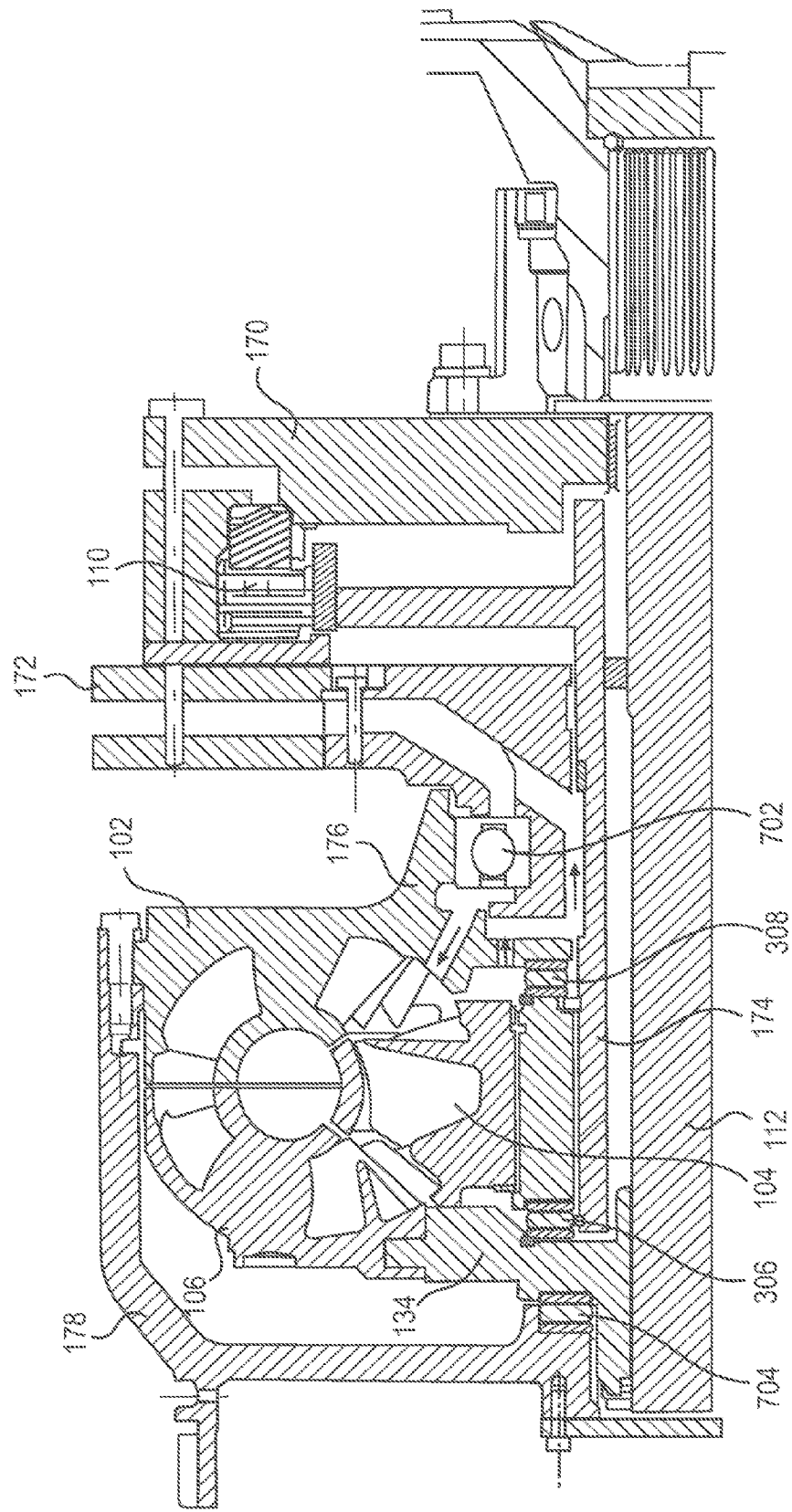
FIG. 9 is a cross-sectional view of an implementation of the torque converter with the stator clutch of FIG. 1.

The FIG. 9 is a cross-sectional view of an implementation of the torque converter with the stator clutch of FIG. 1. In particular, FIG. 9 shows a torque converter 700 having a rotating housing 178, an impeller 102, an impeller hub 176, a turbine 106, a turbine hub 134, a stator 104, a stator hub 174, a clutch housing 170, a stator clutch 110, and a wall structure 172. Each of these components operating and arranged in a substantially similar manner to that as described above with respect to the description of FIG. 2.

Additionally, FIG. 9 shows bearings 702 arranged between the impeller hub 176 an extension of the wall structure 172. In a particular aspect, the bearings 702 may be ball bearings. The torque converter 700 further includes bearings 704 arranged between the turbine hub 134 and the rotating housing 178. In a particular aspect, the bearings 704 may be thrust bearings. Finally, the stator hub 174 may include bearings 306, 308 arranged on either side thereof. The arrangement of the torque converter 700 allows the stator clutch 110 to be more easily externally serviceable and additionally this arrangement provides radial support.

INDUSTRIAL APPLICABILITY

The disclosure is universally applicable as a torque converter having a stator clutch for many types of off highway vehicles, such as, for example, machines associated with industries such as mining, construction, farming, transportation, etc. For example, the vehicle may be an earth-moving machine, such as a track type tractor, track loader, wheel loader, excavator, dump truck, backhoe, motor grader, material handler, etc. Additionally, one or more implements may be connected to the vehicle, which may be used for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, moldboards, rippers, scarifiers, shears, snow plows, snow wings, etc. The vehicle may include a prime mover and a transmission together with the torque converter disclosed herein.

Further in accordance with various embodiments of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the hardware implementations may include software implementations that are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A torque converter, comprising:
a prime mover input configured to receive a prime mover input torque from a prime mover;
an impeller configured to rotate in response to the prime mover input;
a turbine arranged with the impeller and configured to rotate in response to rotation of the impeller;
a stator arranged with the impeller and the turbine;
a stator clutch configured to allow rotation of the stator in a first mode and configured to limit rotation of the stator in a second mode;
a stator clutch actuator configured to activate and limit rotation of the stator in the first mode during particular operations including one of utilizing a retarding function or utilizing the retarding function during downhill driving and the stator clutch actuator further configured to deactivate and allow rotation of the stator in the second mode; and
a torque converter output.

2. The torque converter of claim 1, wherein the particular operations include utilizing the retarding function, utilizing the retarding function during downhill driving, and utilizing the retarding function during directional shifts.

3. The torque converter of claim 1, wherein the stator clutch actuator comprises at least one of a controller, a stator clutch piston, and a hydraulic actuation source.

4. The torque converter of claim 1, wherein the stator clutch includes at least one friction disk and at least one separation disk.

5. The torque converter of claim 1, wherein the stator comprises a stator hub and the stator clutch engages the stator hub.

6. The torque converter of claim 1, further comprising:
a torque divider configured to receive the prime mover input and divide the prime mover input torque into at least a planetary system input torque and another torque input to the impeller; and
a planetary gear system configured to receive the planetary system input torque, the planetary gear system includes at least one of a sun gear, a planet gear, a ring gear, and a planet carrier.

7. The torque converter of claim 1, further comprising bearings supporting at least the impeller, the stator, the turbine, and the stator clutch.

8. A vehicle comprising a prime mover, a transmission, and the torque converter of claim 1.

9. A process of converting torque for operation of a vehicle, comprising:
receiving a prime mover input torque from a prime mover;
operating an impeller in response to the prime mover input torque;
generating a torque output with a turbine arranged with the impeller in response to operation of the impeller;
limiting rotation of a stator in a first mode during operations that include one of utilizing a retarding function or utilizing the retarding function during downhill driving; and
allowing rotation of the stator in a second mode.

10. The process of claim 9, wherein the particular operations include utilizing the retarding function, utilizing the retarding function during downhill driving, and utilizing the retarding function during directional shifts.

11. The process of claim 9, wherein the limiting rotation of the stator in the first mode during the particular operations and allowing rotation of the stator in the second mode is in response to actuation by at least one of a controller, a stator clutch piston, and a hydraulic actuation source.

12. The process of claim 9, further comprising:
dividing the prime mover input torque with a torque divider into at least a planetary system input torque and another torque input to the impeller;
receiving the planetary system input torque into a planetary gear system; and
inputting into a ring gear of the planetary gear system an output of a torque converter, and inputting the planetary system input torque to a sun gear of the planetary gear system, and wherein the generating the torque output includes connecting to a planet gear of the planetary gear system.

13. A torque converter, comprising:
means for receiving a prime mover input torque from a prime mover means;
means for operating an impeller means in response to the means for receiving the prime mover input torque;
means for generating a torque output with a turbine means arranged with the means for operating the impeller means;
means for limiting rotation of a stator means in a first mode during particular operations including one of utilizing a retarding function or utilizing the retarding function during downhill driving; and
means for allowing rotation of the stator means in a second mode.

14. The torque converter of claim 13, wherein the particular operations include utilizing the retarding function, utilizing the retarding function during downhill driving, and utilizing the retarding function during directional shifts.

15. The torque converter of claim 13, wherein the means for limiting rotation of the stator means in the first mode during the particular operations and the means for allowing rotation of the stator means in the second mode is in response to actuation by at least one of a controller means, a stator clutch piston means, and a hydraulic actuation means.

16. he torque converter of claim 13, wherein the means for limiting rotation of the stator means in the first mode during the particular operations and means for allowing rotation of the stator means comprises a lockup clutch means.

17. The torque converter of claim 16, wherein the lockup clutch means includes at least one friction disk and at least one separation disk.

18. The torque converter of claim 16, wherein the stator means comprises a stator hub and the lockup clutch means engages the stator hub.

19. The torque converter of claim 13, further comprising:
means for dividing the prime mover input torque with a torque divider means into at least a planetary system input torque and another torque input to the impeller means;
means for receiving the planetary system input torque into a planetary gear system means; and
means for inputting into a ring gear of the planetary gear system means an output of the means for generating the torque output, and inputting the planetary system input torque to a sun gear of the planetary gear system means, and wherein the means for generating the torque output includes connecting to a planet gear of the planetary gear system means.

20. A vehicle comprising a prime mover, a transmission, and the torque converter of claim 13.

* * * * *

UNITED STATES PATENT AND TRADEMARK OFFICE
CERTIFICATE OF CORRECTION

PATENT NO. : 8,939,859 B2
APPLICATION NO. : 13/656162
DATED : January 27, 2015
INVENTOR(S) : Jawalkar Nagaraj et al.

It is certified that error appears in the above-identified patent and that said Letters Patent is hereby corrected as shown below:

Specification

Column 3, line 10, delete "converter" and insert -- converter 1. --.

Signed and Sealed this
Seventeenth Day of November, 2015

Michelle K. Lee
*Director of the United States Patent and Trademark Office*